(12) United States Patent
Wee

(10) Patent No.: US 8,636,221 B2
(45) Date of Patent: Jan. 28, 2014

(54) RADIO FREQUENCY TRANSPONDER

(75) Inventor: Leonard Wee, Singapore (SG)

(73) Assignee: Greenclay International Pte Ltd, Singapore (SG)

(*) Notice: Subject to any disclaimer, the term of this patent is extended or adjusted under 35 U.S.C. 154(b) by 0 days.

(21) Appl. No.: 12/449,954

(22) PCT Filed: Jul. 17, 2008

(86) PCT No.: PCT/SG2008/000257
§ 371 (c)(1),
(2), (4) Date: Sep. 4, 2009

(87) PCT Pub. No.: WO2009/014499
PCT Pub. Date: Jan. 29, 2009

(65) Prior Publication Data
US 2010/0090011 A1   Apr. 15, 2010

Related U.S. Application Data

(60) Provisional application No. 60/929,984, filed on Jul. 20, 2007.

(51) Int. Cl.
*G06K 19/06* (2006.01)
*G06K 19/00* (2006.01)

(52) U.S. Cl.
USPC .......................................... 235/492; 235/487

(58) Field of Classification Search
USPC ................... 235/451, 487, 492, 375, 380
See application file for complete search history.

(56) References Cited

U.S. PATENT DOCUMENTS

| | | | | |
|---|---|---|---|---|
| 5,804,026 | A | * | 9/1998 | Vogt .............................. 156/295 |
| 6,285,284 | B1 | * | 9/2001 | Soe et al. ................... 340/572.1 |
| 6,497,371 | B2 | * | 12/2002 | Kayanakis et al. ........... 235/492 |
| 7,161,542 | B2 | * | 1/2007 | Endo et al. ..................... 343/702 |
| 7,315,248 | B2 | * | 1/2008 | Egbert ........................ 340/572.7 |
| 7,703,687 | B2 | * | 4/2010 | Barczyk et al. ............... 235/492 |
| 7,728,734 | B2 | * | 6/2010 | Arai et al. .................. 340/572.7 |
| 2006/0097057 | A1 | | 5/2006 | Forad |
| 2006/0154029 | A1 | | 7/2006 | Antonini |
| 2010/0181381 | A1 | * | 7/2010 | Carrender ..................... 235/488 |
| 2010/0181383 | A1 | * | 7/2010 | Ohashi et al. ................. 235/492 |
| 2012/0168056 | A1 | * | 7/2012 | Antonini ......................... 156/67 |

FOREIGN PATENT DOCUMENTS

EP       1018703       1/1999
WO   WO 2006/045395   9/2005

* cited by examiner

*Primary Examiner* — Thien M Le
*Assistant Examiner* — April Taylor
(74) *Attorney, Agent, or Firm* — Axis Intellectual Capital Pte Ltd

(57) ABSTRACT

A transponder including a transponder circuit, wherein a first surface of the transponder has an adhesive backing that allows the transponder to be attached to an article. A second surface of the transponder may include a material having a high coefficient of friction such that, when the transponder is attached to the article, the material impedes the article from slipping on an external surface. The transponder may also include a substrate layer, wherein a first surface of the substrate layer is the first surface of the transponder, and a second layer that includes the transponder circuit, the second layer being disposed on the substrate layer.

13 Claims, 3 Drawing Sheets

RADIO FREQUENCY TRANSPONDER

FIELD OF INVENTION

The present invention relates broadly to radio frequency transponders.

BACKGROUND

Many identification/access devices currently use radio frequency identification (RFID). Entities which utilise these identification devices may include, for example, hotels, hospitals, companies, member-only establishments and the like. RFID devices are also used to provide secure payment transactions at various facilities. For example, RFID devices are used to access public transportation, to pay for merchandise at particular locations, and even for vending machine payment.

Generally, these RFID devices are in the form of paper or plastic cards (e.g. polyurethane (PU)) containing an RFID chip that provides entry into secured areas, or that maintains a balance of prepaid cash. Many holders of such identification devices usually keep such devices in wallets or purses. As such, these devices may be lost when the holders' wallet or purse is misplaced/stolen. When such losses occur, the users may experience some manner of inconvenience and/or be required to pay a fee in order to obtain a replacement identification device.

One solution provided to assist users in keeping track of RFID cards is to integrate the RFID capability into, for example, a cellular telephone. One such solution uses Near Field Communication, also known as NFC. It is a short-range high frequency wireless connectivity technology operable over a typical distance of about 10 cm. NFC combines the interface of a smartcard with RFID technology and a reader into a single device for enabling contactless two-way interactions among NFC-enabled devices. However, the smartcard and the reader for enabling NFC may be integrated into the devices, for example mobile phones. This solution can be quite costly.

An alternative form of attaching an internal antenna to the electrical circuit of mobile phones can be used to enable NFC connectivity. However, a model specific design for the antenna is required to fit each different model of mobile phone, making it difficult to manufacture different antennas for all brands and models of mobile phones available in the market. Furthermore, this form cannot be adopted for mobile phones whose back covers cannot be detached, or mobile phones with a metal back cover which could block the antenna signal.

Another problem faced by consumers in today's marketplace is that the various portable electronic devices that they use, such as cell phones, PDAs, etc., tend to slide when placed on a surface. One solution that has been proposed for this problem is to proved the devices with some form of anti-slip attachment that helps to stabilize the devices when they are placed on slippery surfaces.

There are currently a few products in the marketplace that manufacture and sell these anti-slip attachments. The market leader is Egrips®, a US company which produces adhesive stickers with proprietary technology for use on mobile devices. If placed correctly, the stickers may help prevent the mobile devices from slipping when placed on various surfaces.

A need therefore exist to provide a system that seeks to address at least one of the above mentioned problems.

SUMMARY

One aspect of the present invention provides a transponder including a transponder circuit, wherein a first surface of the transponder has an adhesive backing that allows the transponder to be attached to an article.

In alternate embodiments, a second surface of the transponder may include a material having a high coefficient of friction such that, when said transponder is attached to said article said material impedes said article from slipping on an external surface.

In other embodiments, the transponder may further include a substrate layer, wherein a first surface of the substrate layer is the first surface of said transponder, and a second layer comprising the transponder circuit, the second layer being disposed on the substrate layer. The transponder may further include a third layer disposed on the second layer, wherein a first surface of said third layer comprises said second surface of said transponder. The transponder may further include a fourth layer disposed between said second and third layers, wherein said third layer is transparent such that anything written on a surface of said fourth layer is visible to an observer.

The transponder may further include an electromagnetic interference (EMI) layer disposed between the second layer and the substrate layer. The substrate may include an electromagnetic interference (EMI) layer.

In further embodiments, the transponder circuit may be a radio frequency identification (RFID) circuit. The transponder may further include an antenna coupled to the RFID circuit. The RFID circuit may further include a memory with read-only and re-writable portions; and a microcontroller with a counter coupled to the memory. The re-writable memory portion may be automatically over-written by the microcontroller after a pre-determined period of time.

In other embodiments, the transponder may provide entry into a secured location. Alternately, the transponder may maintain a cash balance, and may be used to spend said cash balance. The transponder may be flexible such that it may be adhered to a contoured surface.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Figure 1:
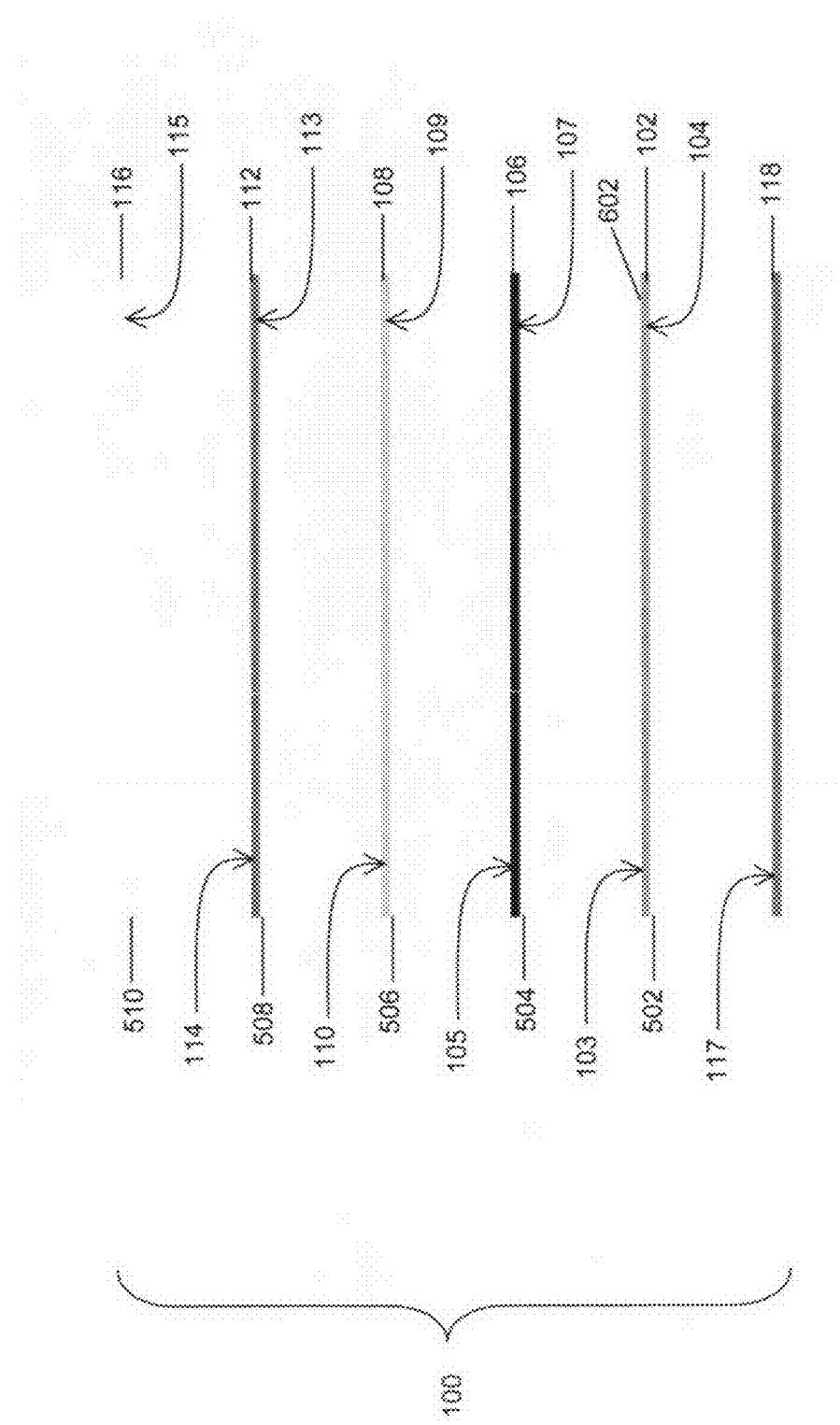
FIG. 1 shows an exploded side view of one embodiment of the present invention.

FIG. 1 shows an exploded side view of an example embodiment of a transponder 100 according to the present invention. The transponder 100 may include an adhesive surface 502 that allows it to be attached to a surface of an article or handheld device. The article or handheld device may be anything that a person would like to use to replace the current cards being used in the marketplace. By way of example and not limitation, the article or device could be a folder, a wallet, an address book, a portable electronic device such as a mobile phone, a personal digital assistant (PDA), a handheld game console, a media player, etc.

The transponder 100 may include a substrate 102 having an upper surface 103 and a lower surface 104. It is understood that the terms "upper" and "lower" are being used to refer to the orientations shown in FIG. 1. Other orientational descriptions are also possible. All such orientational descriptions fall within the scope of the illustrated embodiments of the present invention. A circuit layer 106 having an upper surface 105 and a lower surface 106 may be disposed on the upper surface 103 of the substrate 102. An optional graphics layer 108 having an upper surface 110 and a lower surface 109 may be disposed on the upper surface 105 of the circuit layer 106. Also optionally, a non-stick or grippy layer 112 having a non-stick upper surface 114 and a lower surface 113 may be disposed on either the upper surface 110 of the graphics layer 108, or on the upper surface 105 of the circuit layer 106.

For ease of transport and sale, the lower surface 104 of the substrate layer 102 of the transponder 100 may be attached to an upper surface 117 of a backing layer 118 that is affixed to, for example, a card or other device provided for transport (not shown). Similarly, a lower surface 115 of a protective layer 116 may be temporarily attached to an upper surface 105, 110, 114 of the transponder 100. In use, the transponder 100 may be removed from the backing layer 118 and coupled to an article or device. Similarly, the protective layer 116 may be removed once the transponder 100 has been attached to such a device.

The layers 102, 106, 108 and 112 may be made from various materials, having different properties. For example, the layers 102, 106, 108 and 112 may have different flexibilities, surface characteristics, etc. This will be discussed in more detail below.

In one embodiment, the transponder 100 may include the substrate 102 and the circuit layer 106 disposed on the upper surface 103 of the substrate 102. In this embodiment, the lower surface 104 of the substrate 102 may include an adhesive 502 that allows the transponder 100 to be attached to an article or device. In some embodiments, the adhesive 502 leaves no visible stain or mark on the surface of the article when the transponder 100 is removed from the article. Various adhesives having these properties are known to those of skill in the art.

In this embodiment, the upper surface 105 of the circuit layer 106 may include a material that has a high coefficient of friction, i.e. it provides a grippy layer. The high coefficient of friction may be obtained, for example, by using a suitable material having a high coefficient of friction, by applying a coating on the upper surface 105 of the circuit layer 106, or by subjecting the upper surface 105 to a process(es) which increases the coefficient of friction. By way of example and not limitation, the static coefficient of friction may be in a range of 6.5 to 8.5, while the kinetic coefficient of friction may be in a range of 3.5 to 5.5. It is understood that other ranges are also possible. The high coefficient of friction of the upper surface 105 may impede sliding of the transponder 100, and/or the article, when the transponder or article are placed on a surface.

In optional embodiments, additional layers may be added on to the circuit layer 105. For example, the optional graphics layer 108 may be disposed on the upper surface 105 of the circuit layer 106. The upper surface 110 of the graphics layer 108 may have printed indicia that is visible to a person viewing the transponder 100 or article.

Figure 4:
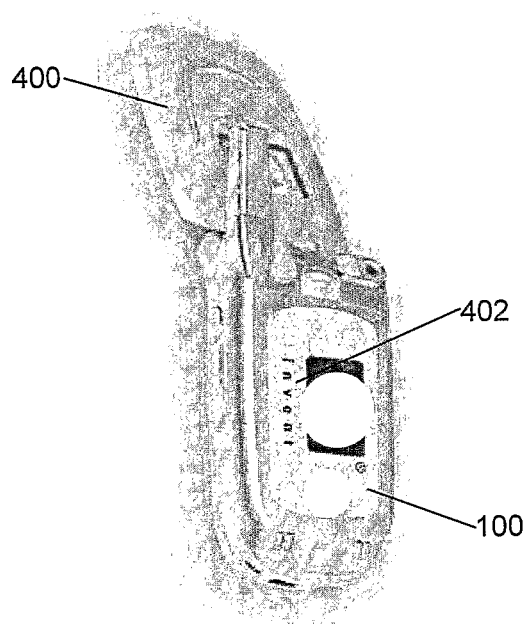
FIG. 4 shows an example application of one embodiment of the present invention.

An example of the printed indicia (402) may be seen in FIG. 4. As illustrated, the transponder 100 has been adhered to a handheld device 400. The upper surface 110 of the graphics layer 108 has indicia of a logo and slogan of a company. The indicia may include any type of graphics or text such as, for example, advertisements, logos, public messages, pictures and the like. The indicia may be for example, coloured, monochromatic, grey-scale or black-and-white. In this regard, the transponder 100 may be used as a way of advertising, a way to propagate a public message (for example, "Smoking is bad for your health"), or even as a gift (for example, a person giving a friend a transponder 100 with a picture of them together). In this embodiment, the upper surface 110 of the graphics layer 108 may also include a material that has a high coefficient of friction, i.e. it provides the grippy layer described above.

In some embodiments, an additional non-stick or grippy layer 112 having a non-stick upper surface 114 and a lower surface 113 may be disposed on the upper surface 110 of the graphics layer 108. In this embodiment, the grippy layer may be made from a transparent material that allows viewing of the indicia 402 on the graphics layer 108. As described above, the upper surface 114 of the grippy layer 112 has a high coefficient of friction, to impede sliding.

In an alternate embodiment, the transponder 100 may include the transponder layer 106 having at least one additional layer 108, 112 disposed on the upper surface 105 of the transponder layer 106. In this embodiment, the lower surface 107 of the transponder layer 106 may include an adhesive 504 that allows the transponder 100 to be attached to an article or device, as described above. Similarly, the upper surface of the layers 108, 112 may be made from a material having an high coefficient of friction.

It is understood that the various layers may be combined in different orientations. Any transponder 100 that includes an adhesive surface 502 for attaching to an article is deemed to fall within the scope of the illustrated embodiments. Similarly, any transponder 100 that optionally includes an upper grippy surface that impedes sliding is deemed to fall within the scope of the illustrated embodiments.

The various layers 102, 106, 108, 112 may be attached to each other using, for example, a pressure sensitive adhesive 502, 504, 506, 508 and 510. Other methods of bonding the layers may also be used. In some embodiments, the transponder 100 may be flexible, to allow the transponder 100 to be attached to articles having uneven surfaces.

In some embodiments where the transponder 100 may be attached to a metallic surface, the substrate 102 may be made from an electromagnetic interference (EMI) blocking material, such as ferrite. The substrate 102 that is made from an EMI blocking material, or a separate EMI layer 602, concentrates the electromagnetic wave and maintains the magnetic flux, which could otherwise be disrupted by the metallic surface. This provides an increased range for the transponder 100 when attached to metallic surfaces.

The various layers 102, 106, 108, 112 may have varying thicknesses. For example, the substrate 102 may be about 0.1 mm to about 0.2 mm thick. The circuit layer 106 may be about 0.2 mm thick. The graphics layer 108 may be about 0.03 mm thick. The grippy layer 112 may be about 0.4 mm thick. In some embodiments, the transponder 100 is approximately 1.0 mm or less in total thickness. It is understood that different thicknesses for the various layers 102, 106, 108, and 112, and the transponder 100 as a whole, may also be used. All the components of the transponder 100 may be processed and delivered as a single piece. In one embodiment, the transponder 100 can have dimensions of about 2.5 cm by 5 cm. It is understood that many other dimensions may also be used.

In example embodiments, the grippy layer 112 (or the grippy surface that is part of the other layers as previously described) may be made of an elastomeric silicon based material or a rubber latex based material. The circuit layer 106 may include a printed, etched or coil copper or aluminum antenna on PU (polyurethane), PET (polyethylene terephthalate) or a paper sheet.

Figure 2:
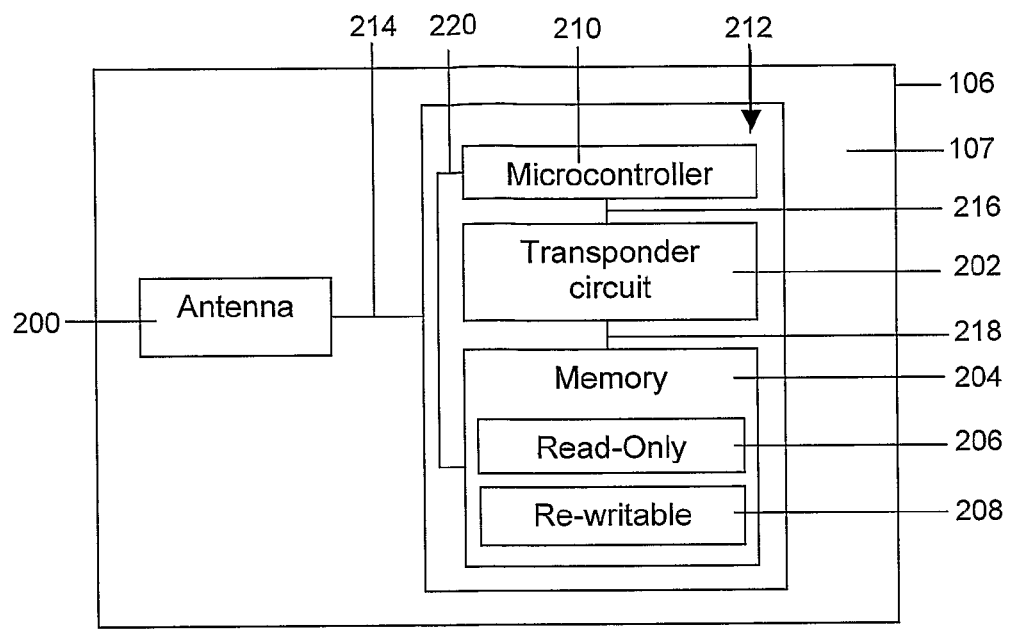
FIG. 2 shows a top schematic representation of one embodiment of a circuit substrate shown in FIG. 1.

FIG. 2 illustrates one example of a circuit layer 106 that may be used with the transponder 100 shown in FIG. 1. The circuit layer 106 may include an antenna 200 and a chip 212, having a corresponding electrical connection represented as line 214, disposed on the lower surface 107 of the transponder layer 106. It is understood that the electrical connection 214 may include multiple wires, as known to those of skill in the art. The chip 212 may be an RFID chip approximately 100 microns to 500 microns thick. It is understood that other size chips could also be used.

In some embodiments, the chip 212 may include a transponder circuit 202 and a memory 204 with both read-only 206 and re-writable 208 portions for storage of data, having a corresponding internal electrical connection represented as line 218. In some embodiments, the memory 204 may be integrated into the transponder circuit 202. The storage capacity of the memory 204 may typically be up to 16 KB. However, other storage capacities, both larger and smaller, may also be used.

In some embodiments, the chip 212 may further include a microcontroller 210, having corresponding electrical connections to the transponder circuit 202 and the memory 204, represented as lines 216 and 220 respectively. In alternate embodiments, the memory 204, and microcontroller 210 may be integrated into the transponder circuit 202. In some embodiments, the microcontroller 210 may overwrite the re-writable memory portion 208 of the memory 204 after a pre-determined period of time has passed. In operation, the transponder circuit 202 may become non-functional in terms of transmitting data once the re-writable memory portion 208 of the memory 204 is over-written.

It is understood that, depending on the specific intended use of the transponder 100, various circuit designs for the circuit layer 106 of the transponder 100, adapted to various standards known to those of skill in the art, may be used. By way of example and not limitation, the chip 212 may conform to ISO/IEC 14443 A/B, ISO/IEC 18092, ISO/IEC 18000-3, and/or other standards.

In some embodiments, the specifications of the RFID chip 212 can be designed to conform to ISO/IEC 14443 A/B standards for operation at a frequency of 13.56 MHz and/or the current standards adopted by various government authorities for the contactless e-purse application (CEPAS), providing micro-payment applications across multiple interfaces offered by different system operators. In alternate embodiments the transponder 100 may be used for operations in the frequency ranges of low frequency 30-300 kHz, high frequency 5-50 MHz and ultra-high frequency 700-950 MHz.

The transponder circuit 202 may be a radio frequency identification (RFID) integrated circuit. In some embodiments, the RFID integrated circuit may be passive, as data may not be required to be transmitted over distances beyond ten centimeters. As the passive RFID integrated circuit would not be power-intensive, a power source need not be incorporated within the transponder circuit 202. In alternate embodiments, a power source may be incorporated into the transponder circuit 202. In other embodiments, capacitors may be incorporated as the power source to store charges and power the transponder 100.

In some embodiments, the antenna 200 may be a dipole antenna. Other types of antenna designs may also be used. The antenna 200 may also be tuned to operate within a desired frequency range. Similarly, the antenna 200 may be incorporated into any layer of the transponder 100, using appropriate electrical connections to the transponder circuit 202.

Figure 3:
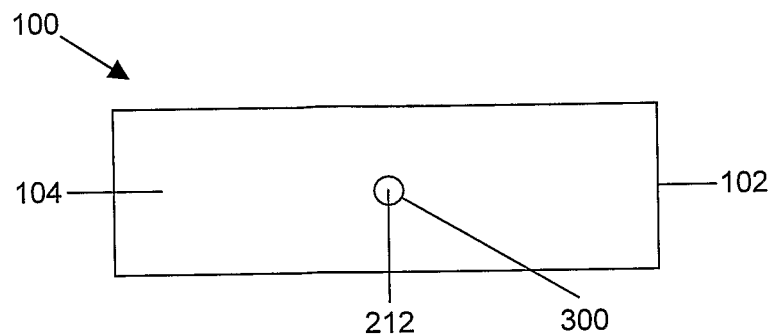
FIG. 3 shows a bottom view of the embodiment of FIG. 1.

FIG. 3 shows a bottom view of the transponder 100 shown in FIG. 1. In this embodiment, a hole 300 may be punched through the substrate 102. The hole 300 is made at a position corresponding to that of the chip 212 disposed on the lower surface 107 of the transponder layer 106, thus exposing part of the chip 212 through the hole 300. This feature can minimize the breakdown of the chip 212 when the transponder 100 is subjected to stress or impact.

One example of a use for the transponder 100 is illustrated in FIG. 4. As shown, the transponder 100 is attached to a device or article 400. In the embodiment illustrated in FIG. 4, the device 400 is a cellular telephone. However, it is understood that the device 400 could be a folder, a wallet, an address book, a portable electronic device such as a mobile phone, a personal digital assistant (PDA), a handheld game console, a media player, etc.

The transponder 100 may be used in various applications. For example, the transponder 100 may be used to grant entry into an area having a secured entry point. The secured entry point may be, for example, hotel rooms, hospitals, fitness centres, offices, residences, member-only establishments, elevators used in the aforementioned places, cinemas and the like. In some embodiments, access may be granted for a specified period of time, or limited to a single application. The transponder 100 may be placed in close proximity to a reader (not shown) at the secured entry point. The close proximity may be a distance of less than ten centimeters. The transponder, whether or not it is adhered to an article or device 400, should not transmit data from a distance greater than about ten centimeters to prevent accidental access via the secured entry point from taking place. Placing the transponder 100 in close proximity to the reader allows the reader to obtain and validate data from the re-writable memory portion in the transponder 100. Access to the secured entry point may be attained when the reader validates the data transmitted from the re-writable memory portion in the transponder 100. If no validation occurs, entry is denied.

Some applications may further include over-writing the re-writable memory 208 after a pre-determined period of time. The microcontroller 210, using the counter 212 may automatically overwrite the re-writable memory 208 after a pre-determined period of time. When the re-writable memory 208 is over-written, subsequent access to the secured entry point may be denied. In this regard, a specific time period for access to the secured entry point, such as in hotel use, may be defined for the transponder 100. Subsequently, the transponder 100 may remain adhered to the device 400, with the transponder 100 being a reminder of earlier access to the secured entry point. Consequently, even though the transponder 100 may no longer aid in gaining access to the secured entry point, the grippy surface of the transponder 100 may still impede sliding of the handheld device 400 when placed on various surfaces. In addition, when the transponder 100 includes advertising/marketing indicia 402, the transponder 100 provides long term exposure for the advertisers.

An alternate example of a use for the transponder 100 is in the area of conducting secure transactions. The secured transactions may be conducted at venues (secured transaction points) such as, for example, hotels, hospitals, fitness centres, retail establishments, transportation systems, member-only establishments etc. The secured transaction points may either be point-of-sale (POS) locations or automated vending machines. The secured transactions may be practiced at more venues if advanced encryption methods are employed. In these applications, the transponder 100 operates as described above with reference to gaining entry points.

Some applications of secured transactions may further include over-writing the re-writable memory 208, either after a pre-determined period of time, or after every transaction to for example, update the amount of credit that is available on the transponder 100.

Embodiments of the transponder 100 of the present invention provide numerous advantages over present technology. As the transponder 100 can be attached to various articles/mobile devices, the issue of loss or replacement is minimized. For example, mobile devices such as mobile phones are high value accessories and hence, less susceptible to being misplaced or lost by the owners/users. In addition, many people consider mobile phones to be essential devices that owners/users regularly carry with them. Access to various areas and or secure transaction vendors is thus enhanced.

When the transponder 100 in example embodiments is used as a substitute for a hotel card, the transponder 100 can be reused when a guest returns to the hotel/group of hotels. No new keycards need to be issued, providing an option of saving costs and promoting loyalty to a brand of hotels. The transponder 100 can also enhance efficiency by shortening the check-in time for a guest. For example, prior to arrival of the guest, back-end information linked to a specific guest's transponder RFID chip unique identification number can be programmed. Similarly, the check-out time can also be reduced by remote programming of the back-end information once a guest has left.

Guests at various locations can also use the transponder 100 attached to their mobile devices. For example, in hotel lifts, an anti-collision feature of the RFID chips in the transponder 100 that conforms to the ISO/IEC 14443-1 standard may allow many users to tap the transponder 100 on a RFID reader in the hotel lifts to access their respective hotel floors faster than with conventional magnetic cards. As the transponders can be attached to the guests' mobile devices or other articles, there are fewer loss and replacement problems for hotels. Guests take added care in the handling of their personal belongings.

Embodiments of the transponder 100 of the present invention may be purchased by large organizations to replace current RFID cards. The transponders may then be provided to customers as needed.

The transponders can also provide an additional added-value benefit to an organization by providing guests with a beneficial adhesive sticker that can be attached to their mobile devices that can aid in preventing slippage of the mobile devices on most surfaces. Furthermore, organizations can employ Customer Relationship Management (CRM) more efficiently by tracking individual guests in the hotels, etc. with a central system.

The transponder according to example embodiments can advantageously combine the practical and relative ease of use with respect to portable devices to render the devices non-slip, as well as RFID technology to allow a user to use the transponders in place of normal access cards. Use for the transponders can include, but are not limited to hotel keycards, office identification cards, club membership cards, and various types of secured transaction cards. The example embodiments in the form of plastic or paper cards can be used for contactless access and/or payment systems.

The embodiments of the transponder can also allow advertisements to be carried in a subtle way. Presently, hotels are upgrading from the conventional magnetic keycards to RFID cards. However, the currently available RFID cards are not as efficient as the transponders herein disclosed, which offer numerous advantages as mentioned above over the current system, irrespective of the current type of technology being employed.

Additionally, embodiments of the transponders can provide personalized graphics or text for a particular user. These graphics or text layouts can also be a form of identity to identify individual mobile devices, as they can be serialized, personalized or may include a photo ID.

Another advantage of the present embodiments of the transponder is that advertising space can be sold to advertisers who want their company logos or products printed on the transponders. Current RFID cards (plastic/paper), offer relatively low advertising values as most people rarely remove the cards from their wallets when they use the cards. In contrast, as the transponders are attached to mobile devices, they are 'exposed' to public view and offer relatively greater impressions than current conventional cards, possibly generating increased revenue streams for the advertisers. Even if the RFID capabilities of the transponders have been remotely deactivated, the transponders can remain attached to mobile devices, ensuring the continuous presence of advertisements for advertisers and those who value space on their client/non-clients mobile devices.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:
1. A transponder comprising:
   a substrate layer, the substrate layer comprising an electromagnetic interference (EMI) layer;
   a second layer comprising a transponder circuit, the substrate layer defining a hole positioned substantially over the transponder circuit;
   an adhesive layer for adhering the transponder to an article; and
   an outer layer comprising a material having a high coefficient of friction, wherein when the article is disposed on a surface with the transponder adhered to the article and interposing the article and the surface, the outer layer abuts the surface to substantially impede slipping of the transponder and consequently the article adhered to the transponder from slipping across the surface.
2. The transponder according to claim 1, wherein the the second layer interposes the substrate layer and the outer layer.
3. The transponder according to claim 2, wherein the transponder further comprises:
   a third layer interposing the second layer and the outer layer.
4. The transponder according to claim 3, further comprising a fourth layer interposing the second and third layers, wherein the third layer is transparent such that anything written on a surface of the fourth layer is visible to an observer.
5. The transponder according to claim 1, wherein the transponder circuit is a radio frequency identification (RFID) circuit.
6. The transponder according to claim 5, further comprising an antenna coupled to the RFID circuit.
7. The transponder as claimed in claim 5 or 6, wherein the RFID circuit further comprises:
   a memory with read-only and re-writable portions; and
   a microcontroller with a counter coupled to the memory.

8. The transponder according to claim 7, wherein the rewritable memory portion may be automatically over-written by the microcontroller after a pre-determined period of time.

9. The transponder of claim 1, wherein said transponder provides entry into a secured location.

10. The transponder of claim 1, wherein said transponder maintains a cash balance, and can be used to spend said cash balance.

11. The transponder of claim 1, wherein said transponder is flexible such that it may be adhered to a contoured surface.

12. The transponder according to claim 1, wherein the EMI layer is made from a material comprising ferrite.

13. The transponder according to claim 1, wherein the EMI layer has a thickness of between 0.1 mm to 0.2 mm.

* * * * *